United States Patent [19]

Tesch, Jr. et al.

[11] Patent Number: 5,215,550
[45] Date of Patent: Jun. 1, 1993

[54] SEEDLING ARRAY TRANSPLANTER

[75] Inventors: Sylvester M. Tesch, Jr., S9023 Timbercrest Trail, Prairie du Sac, Wis. 53578; Bruce L. Bierman, Prairie du Sac, Wis.

[73] Assignee: Sylvester M. Tesch, Jr., Prairie du Sac, Wis.

[21] Appl. No.: 728,197

[22] Filed: Jul. 10, 1991

[51] Int. Cl.$^5$ .............................................. A01C 11/02
[52] U.S. Cl. ...................... 47/1.01; 47/901; 111/104; 111/101; 111/106
[58] Field of Search .............. 47/1.01, 901; 111/104, 111/105, 102, 115, 101, 106, 170

[56] References Cited

U.S. PATENT DOCUMENTS

| | | | |
|---|---|---|---|
| 2,729,493 | 1/1956 | Engel | 111/101 |
| 3,337,986 | 8/1967 | Boucher | 47/1.01 |
| 3,571,971 | 3/1971 | Broersma | 47/1.01 |
| 3,799,078 | 3/1974 | Blackmore et al. | |
| 4,408,549 | 10/1983 | Qvarnstrom | |
| 4,466,554 | 8/1984 | Hanalek et al. | 47/901 |
| 4,703,704 | 11/1987 | Mielke et al. | 47/901 |
| 4,843,982 | 7/1989 | Nagy-Szakaly | 111/115 |
| 4,854,802 | 8/1989 | deGroot | |
| 4,932,338 | 6/1990 | Watanabe et al. | |
| 4,947,579 | 8/1990 | Harrison et al. | 47/901 |
| 4,998,945 | 3/1991 | Holt et al. | 47/901 |
| 5,068,999 | 12/1991 | Visser | 47/901 |
| 5,121,955 | 6/1992 | Visser | 111/104 |

FOREIGN PATENT DOCUMENTS 8601975 4/1986 World Int. Prop. O. .......... 111/101

OTHER PUBLICATIONS

Blackmore Mechanical Transplanter.

*Primary Examiner*—Carl D. Friedman
*Assistant Examiner*—Wynn E. Wood
*Attorney, Agent, or Firm*—Lathrop & Clark

[57] ABSTRACT

The transplant head of the transplanter has an upper plate with four pinholes spaced at the corners of a square of a determined width. A lower plate is adjustably spaced beneath the upper plate and has four pinholes located at the corners of a square of a lesser width than the upper plate pinhole spacing. Four transplant pins extend between the upper and lower holes such that when the upper plate is brought closer to the lower plate by a pneumatically activated mechanical linkage, the pins converge within a seedling plug. Additional pins and pinholes provide for transplanting of an array of seedlings. A pneumatic actuator is connected to the lower plate and is adapted to elevate the transplant head with engaged plug. A carriage is driven by a pneumatic actuator to position a growth pot beneath the engaged plug. A computer controller causes the plug to be lowered into the soil of the growth pot after which the mechanical linkage may be activated to space the plates to disengage the pins from the plug. A table supports the seedling tray beneath the transplant head and is positionable at selected positions such that an array of pins in the transplant head may incrementally transplant the seedlings of a tray into a plurality of flats.

18 Claims, 4 Drawing Sheets

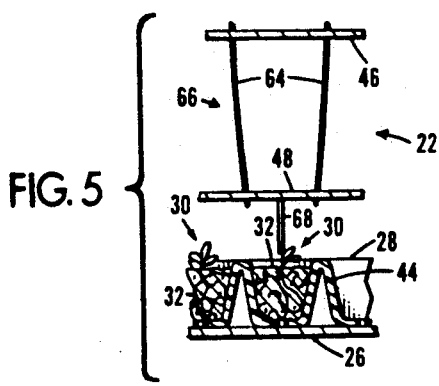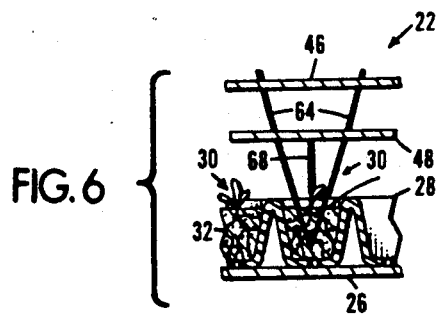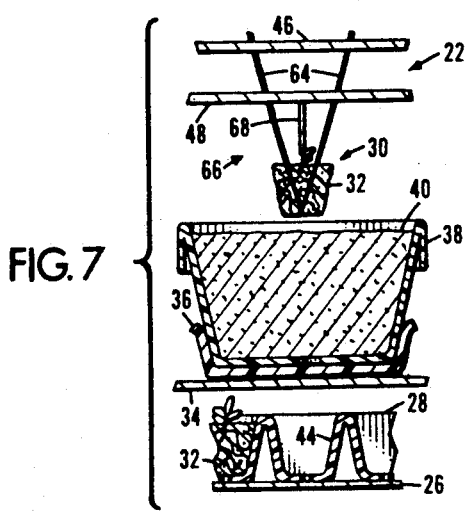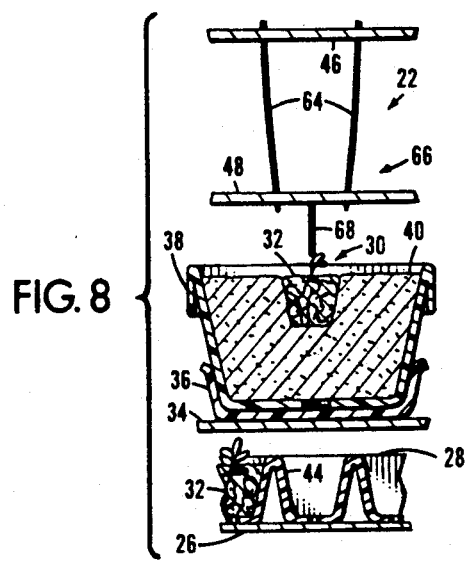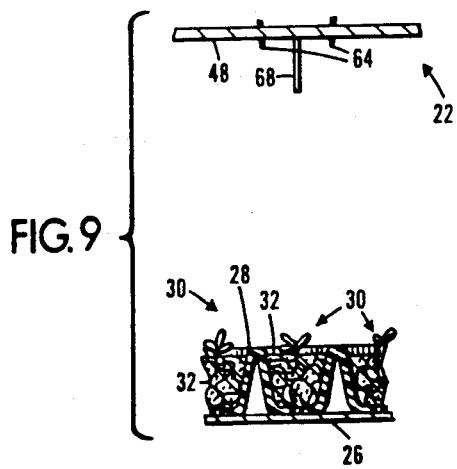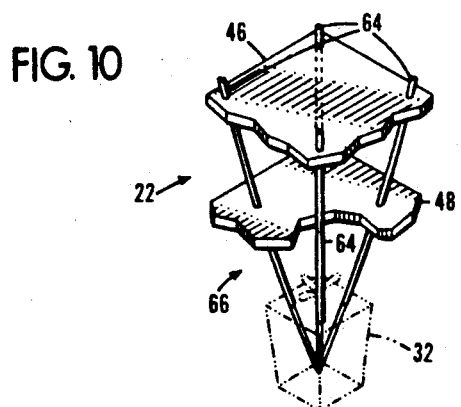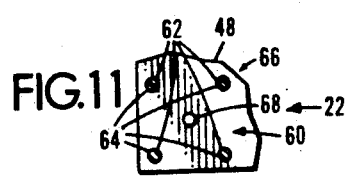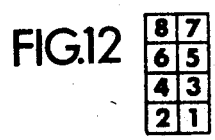

SEEDLING ARRAY TRANSPLANTER

FIELD OF THE INVENTION

The present invention relates to automated nursery equipment in general and to apparatus for transplanting seedlings from germination trays to growth pots in particular.

BACKGROUND OF THE INVENTION

In the nursery industry, plants are initially grown in arrays of small compartments within plastic trays. The small compartment size fully accommodates the plant in the early stages of its development while economically making use of the limited space available within a greenhouse or other nursery building. Once the seedlings have germinated and have approached the maximum size desirable in the small germination compartments, each seedling must be transplanted to a larger pot for further growth and eventual outdoor planting or commercial sale.

The roots of the seedlings will typically form a compact block with the soil contained within the germination compartments, which allows the seedling and the associated soil to be transplanted as a unit. Typically, seedlings have been transplanted by hand into pots prefilled with soil. Hand transplanting allows seedlings to be easily transplanted from seedling arrays of any configuration to single pots or, more commonly, arrays of pots contained within a unitizing flat. However, the high cost of labor and the seasonal nature of transplanting work has made this method undesirable.

Automatic transplanters are known which utilize specially fabricated seedling flats which permit the seedlings to be pressed through the base of a germination compartment into a pot located below. Other known transplanters use cam-driven rotating pairs of plate-like fingers to extract the seedlings, or utilize prebent metallic wire fingers which are retained in a straight configuration and injected into the soil surrounding the seedling. It is known to move the germinating tray on an indexable table with respect to the transplanting head of the apparatus.

What is needed is an apparatus of sturdy construction which may readily accommodate germinating trays of varying array dimensions, and which will rapidly transplant seedlings to pot arrays of a desired configuration.

SUMMARY OF THE INVENTION

The seedling array transplanter of this invention has a transplant head mounted within a housing. The transplant head of the transplanter has an upper plate with four pinholes spaced at the corners of a square of a determined width. A lower plate is adjustably spaced beneath the upper plate and has four pinholes located at the corners of a square of a lesser width than the upper plate pinhole spacing. Four transplant pins extend between the upper and lower holes such that when the upper plate is brought closer to the lower plate by a pneumatically activated mechanical linkage, the pins converge within a seedling plug. Additional pins and pinholes provide for transplanting of an array of seedlings. A pneumatic actuator is connected to the lower plate and is adapted to elevate the transplant head with engaged plug. A carriage is driven by a pneumatic actuator to position a growth pot beneath the engaged plug. A computer controller causes the plug to be lowered into the soil of the growth pot after which the mechanical linkage may be activated to space the plates to disengage the pins from the plug. A table supports the seedling tray beneath the transplant head and is positionable at selected positions such that an array of pins in the transplant head may incrementally transplant the seedlings of a tray into a plurality of flats.

It is an object of the present invention to provide an apparatus for transplanting seedlings from a first array of compartments to a second array of containers.

It is a further object of the present invention to provide a seedling transplanter which may easily accommodate germination trays and growth flats of a variety of array configurations.

It is also an object of the present invention to provide a seedling transplanter which simultaneously transplants a two dimensional array of seedlings.

It is a still further object of the present invention to provide a rugged seedling transplant head of simple construction.

Further objects, features and advantages of the present invention will be apparent from the following detailed description when taken in conjunction with the accompanying drawings.

BRIEF DESCRIPTION OF THE DRAWINGS

FIG. 5 is a fragmentary cross-sectional view of the transplant head of the seedling transplanter of FIG. 1 in position above a seedling to be transplanted.

FIG. 6 is a fragmentary cross-sectional view of the transplant head of FIG. 5 engaged with a seedling plug.

FIG. 7 is a fragmentary cross-sectional view of the transplant head of FIG. 6 with the engaged seedling positioned above a growth pot.

FIG. 8 is a fragmentary cross-sectional view of the transplant head of FIG. 7 disengaged from the transplanted seedling.

FIG. 9 is a fragmentary cross-sectional view of the transplant head of FIG. 8 elevated above a subsequent seedling within the germination tray.

FIG. 10 is a fragmentary isometric view of the transplant head of FIG. 7 engaged with a seedling plug shown in phantom view.

FIG. 11 is a bottom plan view of the transplant head of FIG. 5.

FIG. 12 is a schematic view illustrating the order of germination tray compartment engagement by the transplant head of the seedling transplanter of FIG. 1.

DESCRIPTION OF THE PREFERRED EMBODIMENT

Figure 1:
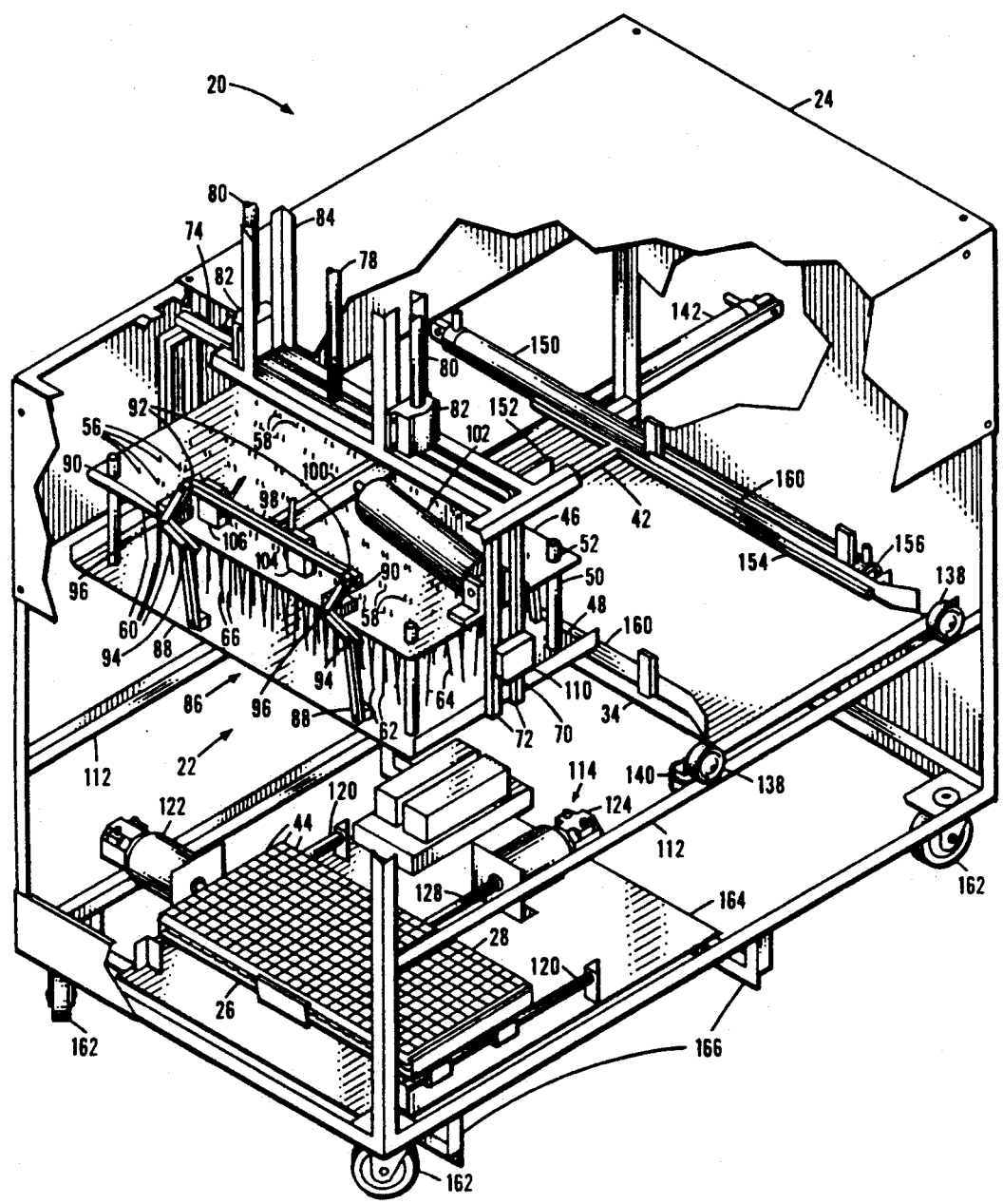
FIG. 1 is an isometric view, partly cut away, of the seedling array transplanter of this invention.

Referring more particularly to FIGS. 1-12, wherein like numbers refer to similar parts, a seedling array transplanter 20 is shown in FIG. 1. The transplanter 20 has a transplant head 22 located within a housing 24 and above a controllable positioning table 26. The transplant head 22 is pneumatically actuated to approach a germination tray 28 located on the positioning table 26 and to engage with and remove plugs 32 containing seedlings 30. A carriage 34 is movable beneath the loaded transplant head 22 to position a flat 36 having a plurality of growth pots 38 filled with soil 40 into which the seedling plugs 32 are transplanted. A pneumatically actuated ejector 42 ejects the loaded flats 36 from the transplanter 20.

The germination tray 28 is a conventional thin-sheet thermoformed plastic article having a rectangular grid-like array of small seedling compartments 44. Conventional germination trays are available in a variety of configurations, usually having an even number of compartments along each axis of the two-dimensional array. The tray 28 has been illustrated as having a 12×24 compartment array.

Once the seedlings 30 have reached a particular size, they must be transplanted into growth pots 38 sufficiently large to accommodate more mature growth. The size of each pot 38 will depend upon the plant species, the eventual end use of the plant, and whether further transplantation is envisioned. The pots may be formed as a single unitary plastic article which may be separated by cutting or by tearing prepunched perforations or, for greater convenience, individual pots 38 may be contained within a plastic flat 36 which retains the pots 38 in a rectangular array. The flats 36 illustrated in FIGS. 3 and 4 have an exemplary array configuration of three rows of 12 pots each.

Figure 2:
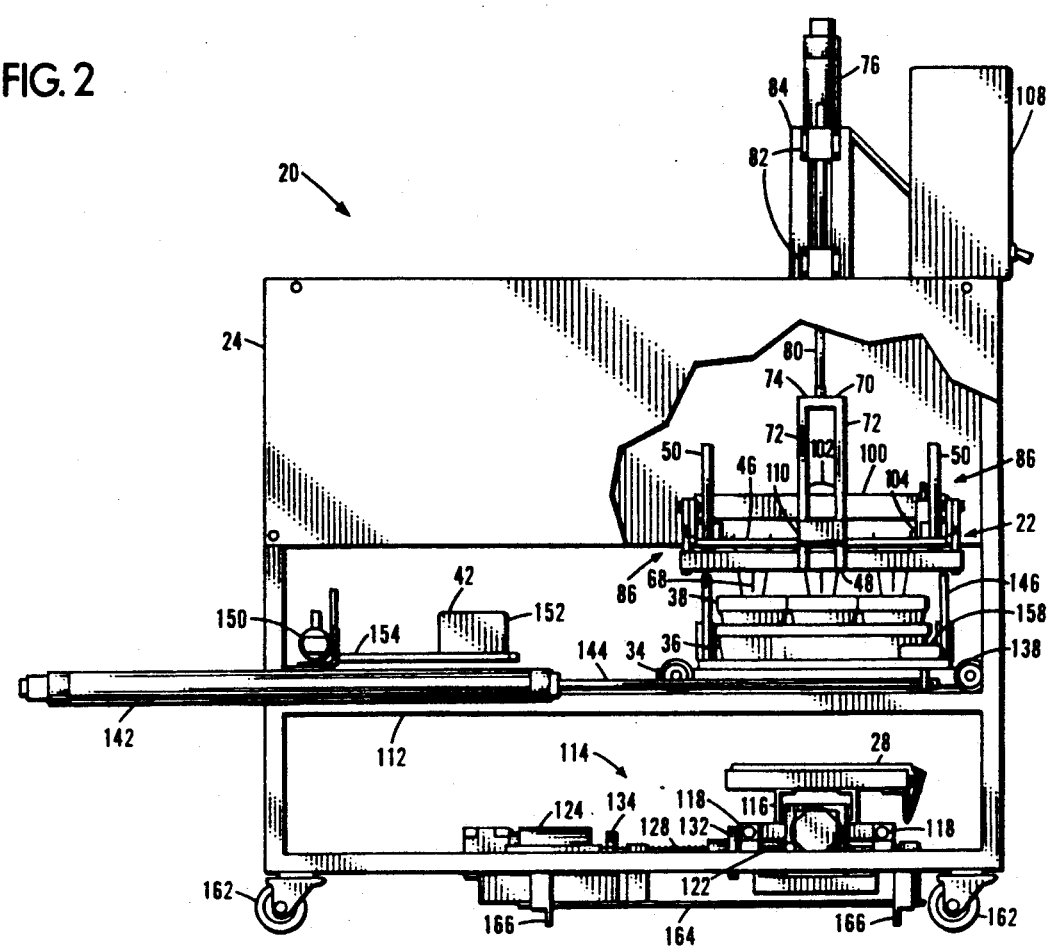
FIG. 2 is a right side elevational view of the seedling transplanter of FIG. 1.
Figure 4:
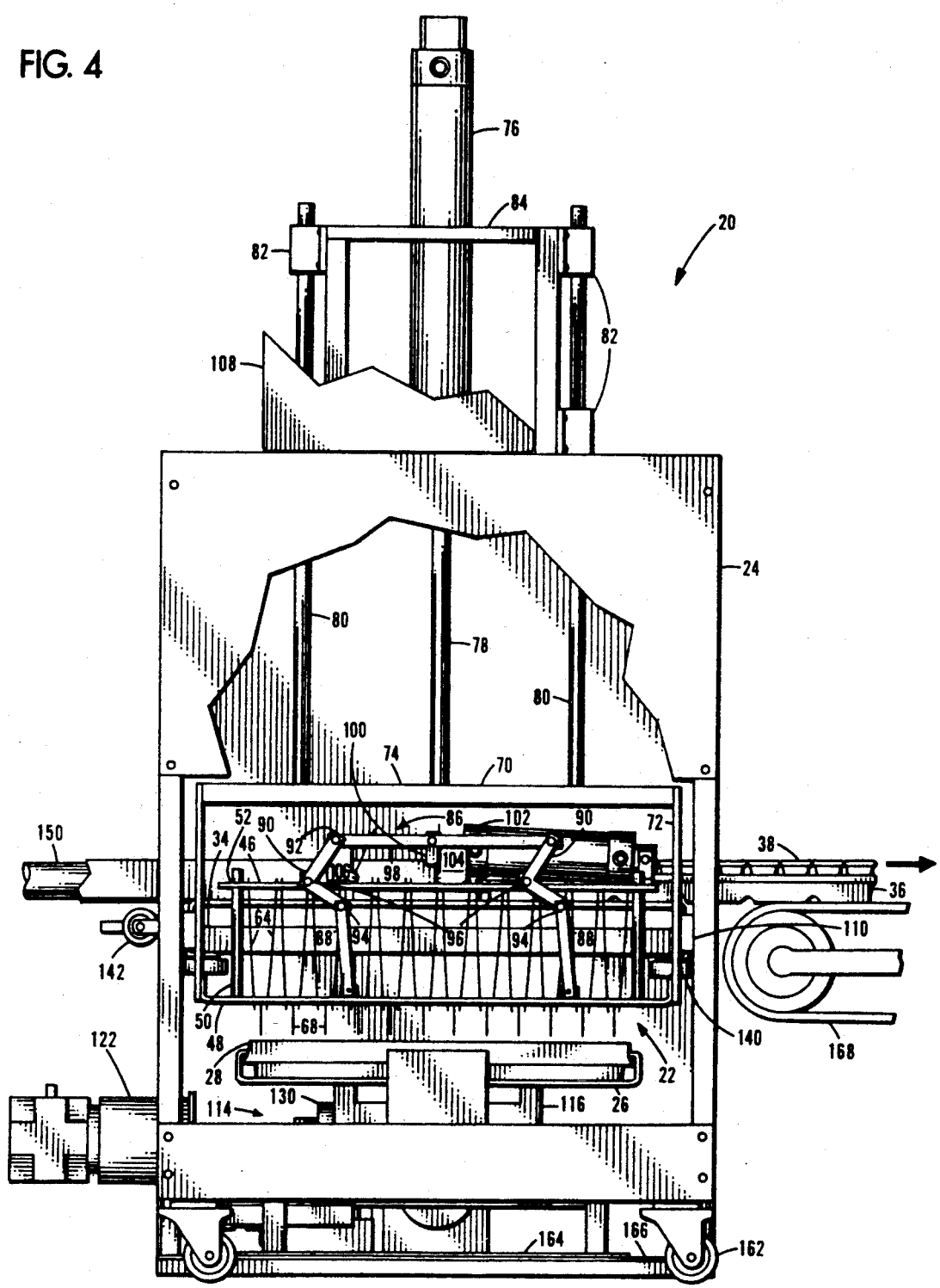
FIG. 4 is a front elevational view of the seedling transplanter of FIG. 1.

The transplant head 22, shown in FIGS. 2 and 4, has an upper plate 46 adjustably positioned above a lower plate 48. Both plates are formed of stainless steel plate stock. Four rods 50 are rigidly connected to the lower plate 48 and extend vertically upwardly from the lower plate at the corners. The upper plate 46 has rod holes 52 through which the corner rods 50 extend. The rods 50 align the upper and lower plates 46, 48 to retain the parallel orientation of the plates at different spacings.

An array of pinhole sets 56 is formed in the upper plate 46. Each pinhole set 56 comprises four pinholes 58 which define the corners of a square. That is, each pinhole set 56 has two pairs of pinholes spaced at a determined distance apart with the pinholes within a pair being spaced a similar distance apart.

The lower plate 48 has an array of pinhole sets 60 which correspond to the upper pinhole sets 56. Each lower plate pinhole set 60 is comprised of four pinholes 62 of diameter approximately 1/32" larger than the diameter of the pinholes 58 in the upper plate 46. This larger diameter allows free sliding movement of the pins. Each lower plate pinhole set 60 defines a square with a center which is located directly below the center of the upper plate pinhole set, but the dimension of the square defined by the pinhole set 60 is smaller than that of the upper plate pinhole set 56. Each pinhole 62 corresponds to a pinhole 58 in the upper plate. However, the distance between the pinholes 62 in a lower plate pinhole set is less than the distance between the pinholes 58 in an upper plate pinhole set 56. All the pinholes 58, 62 in the upper and lower plates 46, 48 are drilled perpendicular to the surface of the respective plates.

A narrow diameter steel transplant pin 64 extends through each corresponding upper plate pinhole 58 and lower plate pinhole 62. Although the length of the pins utilized in a transplant head will depend on the desired depth of pin engagement within a plug of a particular size, the pins 64 are approximately 4.75 inches long, such that 2.5 inches of the pin protrudes beneath the lower Plate when the pins are fully engaged with a plug. The pins 64 which extend through the pinholes 60, 62 of a particular upper plate pinhole set 56 and lower plate pinhole set 60 comprise a single transplant pin set 66.

As shown in FIG. 4, the pins 64, which because of their extended length and small diameter are somewhat flexible, are inclined towards one another within a single transplant pin set 66. Because of the geometry of the pinholes and the plate spacing, the pins are retained within the pinholes 58, 62 without the need for welding or otherwise rigidly bonding the pins to the upper plate.

The transplant head 22 has an array of transplant pin sets 66 which corresponds in number and spacing to the array of growth pots 38 contained within a particular flat 36. In the illustrated transplant head 22 this array consists of three rows of twelve transplant pin sets 66.

As shown in FIG. 11, a stud 68 is rigidly afixed to the underside of the lower plate 48 at the center of each pinhole set 60. Each stud is approximately one inch long. The array of studs 68 assists the disengagement of the transplant pin set 66 from the plugs 32 as described more fully below. The transplant head 22 is connected to a frame 70 which has vertical members 72 which are rigidly connected to the lower plate 48 alone. The vertical members 72 are joined above the transplant head 22 by a horizontal member 74. The horizontal member 74 of the frame 70 is connected to a means for elevating the frame. This means may be a system of mechanical linkages, a chain and sprocket arrangement, a rack and pinion, or a hydraulic piston-cylinder assembly, but in the preferred embodiment is a pneumatic actuator 76. The piston 78 of the pneumatic actuator 76 is rigidly connected to the horizontal member 74. Two stabilizing rods 80 are connected to the horizontal member, one on each side of the piston 78, and each stabilizing rod 80 extends through a pair of bearings 82 mounted on a brace 84 which is supported by the housing 24. For clarity, the hoses of the double-acting pneumatic actuator 76, and the hoses of all pneumatic actuators in the transplanter 20 have been eliminated from the views. The hose connections are entirely conventional.

The pneumatic actuator 76 is adapted to lower the frame 70 and the attached transplant head 22 into a position closely spaced from a germination tray 28 mounted on the positioning table 26, as shown in FIG. 4. The actuator 76 is also adapted to raise the transplant head 22 above the level of the carriage 34 to provide clearance for a loaded flat 36, as shown in FIG. 1.

As shown in FIG. 1, a means is also provided for adjusting the spacing of the upper plate 46 and the lower plate 48 to selectively engage and disengage seedling plugs 32. Elevating linkages 86 are located at the front and rear of the transplant head 22. Each linkage 86 is comprised of two vertical members 88 pivotally connected to the lower plate 48. Two L-shaped links 90, each having a top end 92, a bottom end 94, and a center 96 located between the top and bottom ends, are pivotally mounted at the centers 96 to the upper plate 46. The vertical members 88 are pivotally connected through the bottom end 94 of the L-shaped link 90.

The linkages 86 thus allow the upper plate 46 to be brought closer to the lower plate 48 by displacing the top ends 92 of the L-shaped links 90 horizontally. A means for displacing the top ends 92 horizontally is provided by an actuator 102 connected to a horizontal bar 98 which extends between the top ends 92 of the L-shaped links 90 and which is pivotally connected thereto. A horizontal pusher bar 100 extends between the two horizontal bars 98 of the linkages 86 and is pivotally connected to a pneumatic actuator 102 which is pivotally mounted to the upper plate 46 about a horizontal axis.

Two limit switches 104, 106 are mounted to the upper plate 46 and are in the path of the pusher bar 100. The limit switch 104 is activated when the actuator 102 is retracted and the upper and lower plates 46, 48 are at their greatest allowable spacing such as when the transplant pins 64 are disengaged. The other limit switch 106 is activated when the piston of the double acting pneumatic actuator 102 is extended and the upper and lower plates 46, 48 are at their closest allowable spacing such as when the transplant pins 64 are engaged with a plug 32.

The actuators 76, 102 are controlled by a controller 108 such as the TSX 17 Telemecanique Programmable Controller electronic digital computer to position the transplant head 22 directly above the germination tray 28 or directly above a filled pot flat 36 and to extend or retract the transplant pins 64.

An adjustable stop block 110 is mounted between the vertical members 72 on each side of the frame 70 to control the maximum downward displacement of the transplant head 22. The stop blocks 110 will abut against the horizontal rails 112 which run from the front to the rear of the housing 24 when the transplant head 22 has descended to a level immediately above a tray 28.

The transplant pin sets 66 are positioned to accommodate the spacing of the growth pots 38 in a particular application. As the compartments 44 of each germination tray 28 will generally be significantly smaller than the growth pots 38, two or more flats 36 may be loaded with plugs 32 transplanted from a single germination tray 28.

Figure 3:
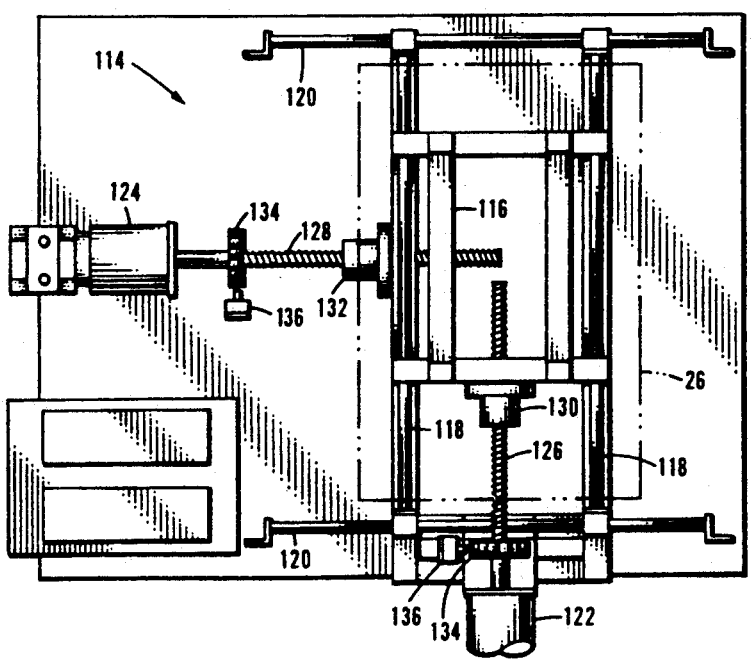
FIG. 3 is a top plan view of the table positioning apparatus of the seedling transplanter of FIG. 1.

After the first transplanting from a tray 28, the tray must be repositioned so that compartments 44 containing untransplanted plugs 32 will be presented to the transplant head 22. A means 114 for positioning the positioning table 26 is shown in FIG. 3. The positioning table 26 is mounted to a support 116. The support is slidably mounted to two horizontal guide rods 118 which allow the table 26 to move in a left-to-right direction. These guide rods 118 are in turn slidably mounted to two horizontal guide rods 120 extending from front to back. Two pneumatic motors 122, 124 drive threaded position control rods 126, 128. The threaded position control rods 126, 128 are engaged with female threaded members 130, 132 which are fixed to the guide rods 118, 120 respectively. Toothed wheels 134 are mounted coaxially to each position control rod 126, 128 and proximity sensors 136 are mounted in closely spaced relation to the toothed wheels 134. The proximity sensor 136 data is carried to the controller 108 which by counting the teeth on the wheels 134 as the position control rods 126, 128 are rotated may precisely position the table 26 with respect to the transplant head 22.

The carriage 34 is supported by four wheels 138 with enclosed ball bearings which rotate about horizontal axes and which travel along the horizontal rails 112. Four guide wheels 140 with sealed ball bearings are mounted about axes perpendicular to the axes of the vertical wheels 138. The guide wheels 140 engage horizontally against the horizontal rails which are preferably formed of angle stainless steel stock. The guide wheels 140 control the left to right positioning of the carriage 34.

A pneumatic actuator 142, best shown in FIG. 3, is mounted to the housing 24 generally aligned with a horizontal rail 112. The actuator piston 144 is connected to the carriage 34 such that the extension of the piston 144 will urge the carriage forward along the horizontal rails 112 so as to position a pot-filled flat 36 carried on the carriage 34 directly beneath the transplant head 22. Stop members 146 extend vertically upwardly from the carriage 34 and are of appropriate height to prevent the transplant head 22 from approaching too closely to the growth pots 38 contained within the flat 36.

An ejector 42 is mounted to a pneumatic actuator 150 connected to the carriage 34. The ejector 42 has a back stop 152 which bears against a flat 36 loaded on the carriage 34. The back stop 152 is connected by an L-shaped member 154 to the actuator piston 156 such that extension of the piston 156, as shown in FIG. 4, will eject a loaded flat 36 from the transplanter 20.

A limit switch 158, shown in FIG. 2, is mounted to the carriage 34 to signal to the controller 108 that a flat has been fully inserted into the carriage. Guide walls 160 are mounted to the carriage and open outwardly to properly align an inserted pot-filled flat 36.

Four caster wheels 162 are mounted to the housing 24 to facilitate transportation of the transplanter 20. The housing 24 is preferably fabricated of stainless steel. The tray positioning mechanism 114 is mounted to a plate 164 which is connected to two brackets 166 of the housing 24.

The seedling transplanter 20 is able to automatically transplant the seedlings from a germination tray 28 into a plurality of pot filled flats 36. The steps of a single transplant cycle are illustrated for a single seedling in FIGS. 5-9. To begin the process a germination tray 28 filled with seedlings 30 contained within plugs 32 is placed manually or by automatic means onto the positioning table 26. The controller 108 has incremented the control rods 126, 128 such that the positioning table 26 is in its initial position. FIG. 12 illustrates schematically the movements of the positioning table 26 to transplant the 12×24 array of plugs 32 into eight flats filled with a 3×12 array of pots 38. The numbered squares of FIG. 12 schematically represent the eight front right compartments of the germination tray 28.

In the initial transplanting step the front right transplant pin set 66 will engage with the plug 32 in the front right compartment 44 of the germination tray 28. The transplant pin sets 66 of the transplant head 22 will at the same time engage alternate plugs 32 in the left-to-right direction of the tray 28 and every fourth plug in the front-to-back direction. After the plugs 32 engaged in the initial step are transplanted to the pots contained within a flat 36 and that flat has been ejected from the transplanter 20 onto the flat take-away conveyor 168, a fresh flat 36 containing soil filled pots 38 is inserted onto the carriage 34 by an automatic apparatus or by hand. The positioning table 26 is incremented by the tray positioning mechanism 114 such that the tray 28 is moved rightwards the distance of one compartment with respect to the horizontally fixed transplant head 22.

As shown in FIG. 5, the vertical actuator 76 is activated by the controller 108 to bring the lower plate 48 of the transplant head 22 to a position closely spaced from the seedling 30. The stud 68 will extend from the lower plate 48 at a position slightly above the level of the plug 32.

As shown in FIG. 6, the actuator 102 located on the upper plate 46 is activated by the controller 108 to move closer to the lower plate 48 hence driving the pins 64 of each transplant pin set 66 through the more narrowly spaced lower pinhole sets 60. This geometry causes the pins 64 of a pin set 66 to converge at a point within the plug 32, as best shown in FIG. 10. The roots of a seedling 30 typically thoroughly fill the plug 32 making the plug a compact mass of roots and soil. The transplant pin set 66 once engaged within the plug 32 is firmly secured to the plug yet is not in contact with the stem or leaves of the seedling and does not harm the roots of the seedling.

As shown in FIG. 7, while the pins 64 of a pin set 66 remain engaged with the dense plug 32, the vertical actuator 76 is activated by the controller 108 to elevate the transplant head 22 and the plugs 32 engaged on the transplant pin sets 66 thereof. Once the transplant head 22 has been raised, the carriage 34 is driven by the carriage actuator 142 into position beneath the elevated transplant head 22. The transplant head 22 is next lowered by the controller 108 to insert each plug 32 within the soil 40 of the pots 38. The soil may have a previously dibbled concavity, or, as illustrated, the soil 40 may be sufficiently uncompacted that the dense plug 32 may be pushed into place by the transplant head 22. The stop members 146 on the carriage 34 halt the downward motion of the transplant head 22 once the plugs 32 have reached an appropriate depth in the pots 38.

As shown in FIG. 8, once the plug 32 has been positioned in the pot 38, the controller 108 actuates the actuator 102 mounted on the upper plate 46 to raise the upper plate above the lower plate and disengage the transplant pins 64 from the plugs 32. The studs 68 abut the plug 32 as the pins 64 are withdrawn and insures that the seedlings 30 are not crushed against the lower plate 48.

After the pots 38 within the flat 36 have been filled with plugs 32 the carriage 34 is returned to its initial rearward position where the ejector 42 presses against the flat 36 and ejects the pot-filled 36 flat from the transplanter 20.

As shown in FIG. 9, the controller then activates the tray positioning mechanism 114 to move the positioning table leftward the width of one compartment and forward the width of one compartment to present untransplanted plugs 32 to the transplant head 22.

In this manner, as illustrated schematically in FIG. 12, the transplanter 20 will make eight transplanting cycles to fill eight pot-filled flats.

It is important to note that the same transplant head 22 may be utilized to transplant from germination trays of different array configuration by reprogramming the controller 108. For example, 6×24 or 9×24 or 6×36 compartment trays may be effectively transplanted to 3×12 arrays of pots within a flat 36 with appropriate programming. Different flat array dimensions may be accommodated by replacing the transplant head 22 with a mechanically identical transplant head having an appropriate array of transplant pin sets.

It should be noted that where pneumatic actuators and motors have been specified hydraulic actuators and motors or electric motors and mechanical or chain driven assemblies may also be employed. Furthermore, although a digital computer controller has been described, an equivalent analog computer or conventional relays and air switches may be employed. Although four pins are preferable for best engagement, two or more pins in each pin set may be employed.

It should also be noted that structure equivalent to the upper and lower plates with drilled pinholes may be provided by a grid of horizontal bars to which the pins are connected which are pressed through a lower grid of bars more closely spaced to cause the pins to converge and engage the plugs.

It is understood that the invention is not confined to the particular construction and arrangement of parts herein illustrated and described, but embraces such modified forms thereof as come within the scope of the following claims.

We claim:

1. An apparatus for transplanting a plant from a first container to a second container, comprising:
   a) an upper plate, the upper plate having portions defining a plurality of pinholes spaced a determined width apart;
   b) a lower plate spaced beneath the upper plate and having portions defining a plurality of pinholes corresponding to the upper plate pinholes, wherein the lower plate pinholes are spaced from one another a distance less than the width of the upper plate pinhole spacing;
   c) a plurality of pins extending between the upper plate pinholes and the lower plate pinholes; and
   d) a frame to which the upper and lower plates are adjustably mounted such that the distance between the plates may be adjusted such that the pins protrude from the lower plate pinholes when the plates are spaced a first distance apart so the pins are adapted to engage with a plant to be transplanted, and such that when the plates are spaced a greater distance apart the pins will disengage from the plant.

2. The apparatus of claim 1 further comprising a stud fixedly mounted to the lower plate between two pinholes, the stud extending downwardly from the lower plate and being adapted to engage against a plant when the pins are disengaged from the plant.

3. The apparatus of claim 1 further comprising:
   a) a housing; and
   b) a means for elevating the frame, the frame elevating means extending between the frame and the housing and adapted to move the plates from a lowered position in proximity to the first container to an elevated position spaced from the first container.

4. The apparatus of claim 1 further comprising an actuator mounted to a plate and operable to move the plates from the first distance spacing to a second, greater, distance spacing to selectively engage and disengage a plant within the first container.

5. The apparatus of claim 1 further comprising a carriage movable in a horizontal plane from a first position beneath the plates to a second position spaced horizontally from the plates, wherein the carriage is adapted to transport the second container into a position beneath the lower plate such that a plant engaged by the pins may be disengaged within the second container, and the transplanted plant and second container may be transported by the carriage to the second carriage position.

6. The apparatus of claim 5 further comprising:
   a) a housing;
   b) an actuator mounted to a plate and operable to move the plates from the first distance spacing to second, greater, distance spacing;
   c) an actuator mounted to the housing and having a vertically extensible piston which is connected to the frame, the frame actuator being operable to move the plates from a lowered position in proximity to the first container to an elevated position spaced from the first container;

d) an actuator mounted horizontally to the housing and having an extensive piston which is connected to the carriage; and e) a controller adapted to control the positions of the apparatus actuators to cyclicly engage plants from the first containers, elevate the plants, move the carriage with the second containers supported thereon to the second carriage position and deposit the plants in the second containers.

7. The apparatus of claim 5 further comprising:

a) an actuator mounted to the housing perpendicular to the direction of travel of the carriage; and b) a member adapted to engage against the second container when the carriage is in its second position, the member being connected to the actuator will cause the member to press against the second container to eject the second container from the transplanter.

8. The apparatus of claim 1 further comprising a means for adjusting the distance between the upper plate and the lower plate.

9. An apparatus for transplanting an array of plants from a first array of containers to a second array of containers, comprising:

a) an upper plate having portions defining a plurality of pinhole sets, wherein each pinhole set has a plurality of pinholes spaced a determined width apart;

b) a lower plate having portions defining a plurality of pinhole sets, wherein each pinhole set has a plurality of pinholes spaced a distance apart which is less than the determined width of the upper plate pinhole set spacing, and wherein each lower plate pinhole corresponds to an upper plate pinhole;

c) a pin extending through each pair of corresponding upper and lower plate pinholes, wherein the pins extending through the upper and lower plate pinholes of two corresponding upper and lower plate pinhole sets comprise a transplanting pin set; and d) a frame to which the upper and lower plates are adjustably mounted such that the distance between the plates may be adjusted such that the pins protrude from the lower plate pinholes when the plates are spaced a first distance apart so the pins of each transplating set are adapted to engage with a plant to be transplanted, and such that when the plates are spaced a greater distance apart the pins will disengage from the plant.

10. The apparatus of claim 9 further comprising a stud fixedly mounted to the lower plate between the pins of each transplant pin set, the studs extending downwardly from the lower plate and being adapted to engage against plants when the pins are disengaged from the plant.

11. The apparatus of claim 9 further comprising:

a) a housing; and b) a means for elevating the frame, the frame elevating means extending between the frame and the housing and adapted to move the plates from a lowered position in proximity to the first array of containers to an elevated position spaced from the first array of containers.

12. The apparatus of claim 9 further comprising:

a) a carriage movable in a horizontal plane from a first position spaced horizontally from the plates, wherein the carriage is adapted to transport the second array of containers into a second carriage position beneath the lower plate such that an array of plants engaged, by the pins may be disengaged within the second array of containers, and the transplanted plants and second array of containers may be transported by the carriage to the second carriage position.

13. The apparatus of claim 12 further comprising:

a) a housing;

b) a first actuator mounted to either of said upper and lower plates and operable to move said plates from the first distance spacing to second, greater, distance spacing;

c) a second actuator mounted to the housing and having a vertically extensible piston connected to the frame, the second actuator being operable to move the plates from a lowered position in proximity to the first array of containers to an elevated position spaced from the first array of containers;

d) a third actuator mounted horizontally to the housing and having an extensible piston which is connnected to the carriage; and e) a controller adapted to control the positions of said first, second, and third actuators to cyclicly engage plants from the first array of containers, elevate the plants, move the carriage with the second array of containers supported thereon to the second carriage position and deposit the plants in the second array of containers.

14. The apparatus of claim 12 further comprising:

a) a fourth actuator mounted to the housing perpendicular to the direction of travel of the carriage; and b) a member adapted to engage against the second array of containers when the carriage is in its second carriage position, the member being, connected to said fourth actuator such that activation of said fourth actuator will cause the member to press against the second array of containers to eject the second array of containers from the transplanter.

15. The apparatus of claim 9 further comprising a means for adjusting the distance between the upper plate and the lower plate.

16. The apparatus of claim 9 further comprising a first actuator mounted to either of said upper and lower plates and operable to move said plates from the first distance spacing to a second, greater, distance spacing to selectively engage and disengage a plant within the first array of containers.

17. The apparatus of claim 9 further comprising a positioning table adapted to support the first array of containers and located beneath the transplant pin sets, the positioning table being horizontally adjustable to present selected first array of containers to the transplant pin sets.

18. The apparatus of claim 17 wherein the positioning table comprises:

a) a planar support which receives the first array of containers;

b) a plurality of first guide rods extending in a first direction;

c) a plurality of second guide rods extending in a direction perpendicular to the first direction, wherein the second guide rods are slidably mounted to the first guide rods and the planar support is slidably mounted to the second guide rod; and d) means for controllably positioning the planar support with respect to the transplant pin sets.

* * * * *